United States Patent [19]

Nakai et al.

[11] Patent Number: 4,821,074
[45] Date of Patent: Apr. 11, 1989

[54] EXPOSURE CONTROL DEVICE FOR A CAMERA

[75] Inventors: Masaaki Nakai, Kawachinagano; Shuji Izumi; Akihiko Fujino, both of Sakai; Nobuyuki Taniguchi, Nishinomiya; Toshio Yamaki, Osaka; Hiromu Mukai, Kawachinagano, all of Japan

[73] Assignee: Minolta Camera Kabushiki Kaisha, Osaka, Japan

[21] Appl. No.: 905,267

[22] Filed: Sep. 9, 1986

[30] Foreign Application Priority Data

| Sep. 9, 1985 | [JP] | Japan | 60-200277 |
| Sep. 9, 1985 | [JP] | Japan | 60-200278 |
| Sep. 9, 1985 | [JP] | Japan | 60-200279 |
| Sep. 9, 1985 | [JP] | Japan | 60-200280 |
| Sep. 10, 1985 | [JP] | Japan | 60-201126 |

[51] Int. Cl.[4] ............ G03B 3/00; G03B 7/08
[52] U.S. Cl. .................. 354/402; 354/406; 354/429; 354/431
[58] Field of Search ......... 354/400, 402, 406, 407, 354/408, 429, 430, 431, 432

[56] References Cited

U.S. PATENT DOCUMENTS

| 4,285,583 | 8/1981 | Canter | 354/432 |
| 4,285,584 | 8/1981 | Canter | 354/432 |
| 4,364,650 | 12/1982 | Terashita et al. | 354/432 |
| 4,394,078 | 7/1983 | Terashita | 354/432 |
| 4,395,099 | 7/1983 | Terasita | 354/430 |
| 4,412,730 | 11/1983 | Saegusa et al. | |
| 4,448,506 | 5/1984 | Saegusa et al. | 354/431 |
| 4,456,354 | 6/1984 | Mizokami | |
| 4,476,383 | 10/1984 | Fukuhara et al. | 354/432 |
| 4,561,752 | 12/1985 | Miyamoto et al. | 354/432 |
| 4,589,756 | 5/1986 | Saegusa | 354/432 |
| 4,629,304 | 12/1986 | Saegusa | 354/432 |
| 4,636,054 | 1/1987 | Saegusa | 354/432 |
| 4,690,536 | 9/1987 | Nakai et al. | |
| 4,693,581 | 9/1987 | Yamaki et al. | |

FOREIGN PATENT DOCUMENTS

| 59-148638 | 11/1978 | Japan . |
| 59-81519 | 5/1984 | Japan . |
| 59-123823 | 7/1984 | Japan . |

*Primary Examiner*—Russell E. Adams
*Attorney, Agent, or Firm*—Burns, Doane, Swecker & Mathis

[57] ABSTRACT

An exposure control device for a camera comprising: first means for measuring light from a central area of an object field, said first measuring means including a plurality of means for receiving light from different portions within the central area, respectively; second means for measuring light from a surrounding area other than the central area, the surrounding area being greater than each portion within the central area; means for selecting between a first exposure control mode and a second exposure control mode; and means for controlling exposure in accordance with one of said plurality of receiving means in said first exposure control mode, and in accordance with all of said plurality of receiving means and said second measuring means in said second exposure control mode.

6 Claims, 10 Drawing Sheets

EXPOSURE CONTROL DEVICE FOR A CAMERA

BACKGROUND OF THE INVENTION

1. Field of the Invention

The present invention relates to an exposure control device for a camera, and more particularly to such a device capable of measuring light from different areas of an object field for controlling an exposure.

2. Description of the Prior Art

In the field of art various types of the above mentioned device have been provided, such as disclosed in U.S. Pat. No. 4,514,073 and Japanese laid open Patent Application No. 59-123824.

In U.S. Pat. No. 4,514,073 there is shown, a device capable of selecting between a spot metering mode and an averaged metering mode. In Japanese laid open Patent Application No. 59-123824, there is disclosed an exposure control device which includes a first means for measuring light from a central area of an object field, a second means for receiving light from a surrounding area other than the central area, and means for controlling exposure in accordance with the first receiving means in a first mode, and in accordance with the first and second receiving means in a second mode. The location of the central area in the object field, however, is not variable, but is fixed with respect to the field of view.

On the other hand, there is disclosed, in Japanese laid open Utility Model Application No. 53-148638, a camera including means for adjusting the focus of the camera with respect to a limited area of an object field and means for controlling the exposure by means of measuring light from an area substantially the same as the limited area. This is for realizing a correct exposure for the limited area of the most interest which is subject to the automatic focus adjustment. However, a correct exposure determined with only the limited area taken into consideration would not always be a correct exposure for an entire object field.

SUMMARY OF THE INVENTION

An object of the present invention is to provide an improved exposure control device capable of measuring different areas of an object field.

Another object of the present invention is to provide an exposure control device capable of measuring light from a limited area and also from a greater are including the limited area, wherein the limited area is variable within the greater area.

Still another object of the present invention is to provide an exposure control device in which an exposure for a limited area of the most interest which is subjected to the automatic focus adjustment is automatically corrected in case of necessity by means of measuring light from an area other than the limited area.

According to the feature of the present invention, the exposure control device comprises first means for measuring light from a central area of an object field, said first measuring means including a plurality of means for receiving light from different portions within the central area, respectively;

second means for measuring light from a surrounding area other than the central area, the surrounding area being greater than each portion within the central area;

means for selecting between a first exposure control mode and a second exposure control mode; and means for controlling exposure in accordance with one of said plurality of receiving means in said first exposure control mode, and in accordance with all of said plurality of receiving means and said second measuring means in said second exposure control mode.

According to another feature of the present invention, the exposure control device comprises first means for measuring light from a first area of an object field;

second means for measuring light from a second area of an object field other than the first area;

means for detecting focus to at least a position within said first area;

means for adjusting focus in response to said detecting means to generate an in-focus signal when an in-focus condition is established;

means for modifying a light measuring output from said first measuring means with a light measuring output from said second measuring means to generate a third light measuring signal;

means responsive to said first and second measuring means for examining whether or not an exposure control in accordance with only said first measuring means is appropriate; and means for controlling exposure in accordance with the light measuring output from said first measuring means obtained upon the generation of the in-focus signal when said examining means decides appropriate, and in accordance with the third light measuring signal obtained upon the generation of the in-focus signal when said examining means decides inappropriate.

DETAILED DESCRIPTION OF THE PREFERRED EMBODIMENT

Figure 1A:
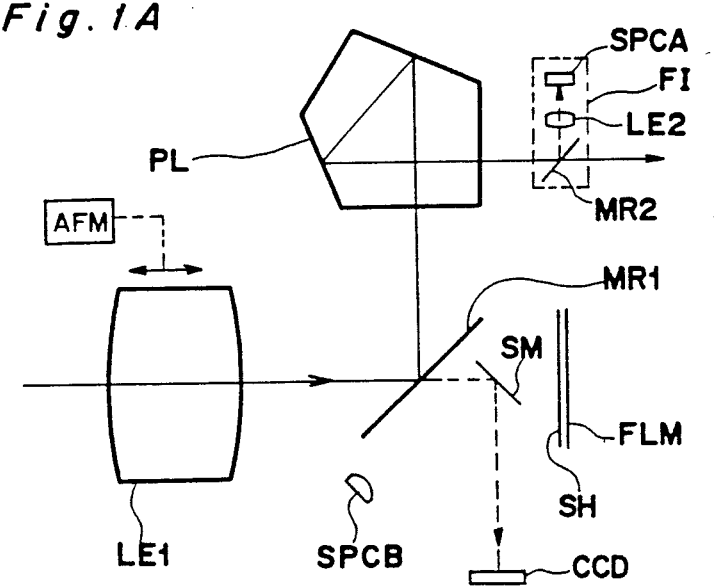
FIGS. 1A and 1b are respectively schematic diagrams showing an optical system of a camera to which an exposure control device according to the present invention is applied.
Figure 1B:
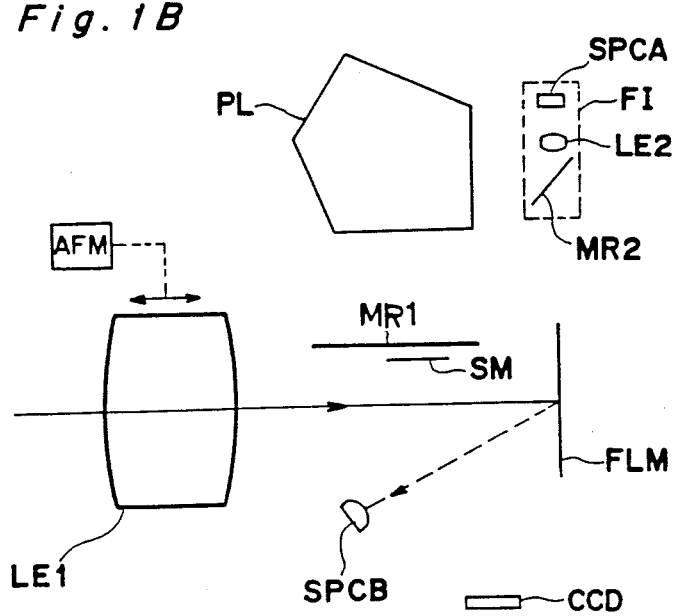

Referring to FIGS. 1A and 1B there is shown an example of an optical system of a divided light measuring device according to the present invention. FIG. 1A shows a condition before and after exposure and FIG. 1B shows a condition during exposure.

There is disposed a half mirror MR1 which is rotatably supported at one end thereof behind an objective lens LE1. Normally the half mirror MR1 is positioned in the slanted attitude as shown in FIG. 1A. Disposed behind the half mirror MR1 are a shutter SH which can be released at the time of picture taking and a photographic film FLM. A pentagonal prism PL is disposed above the half mirror MR1 and a light measuring block FI is disposed behind the prism PL. The light measuring block FI includes a half mirror MR2, a light measuring device SPCA for measuring natural light and a lens LE2, the light projected from the prism PL entering in the half mirror MR2 to be further projected to the light measuring device SPCA through a lens LE2. A sub mirror SM is further disposed behind the half mirror MR1 so as to project the light from the half mirror MR1 to an image sensor CCD made of CCD array for an automatic focusing control. Both half mirrors MR1 and MR2 can rotate together between positions in FIGS. 1A and 1B. When the half mirror MR1 is in the closed position as shown in FIG. 1A, the light from the objective lens LE1 is reflected partly to the prism PL and partly passed through to the image sensor CCD by way of the reflection at the sub mirror SM. On the other hand, when picture taking, the half mirror MR1 and sub mirror SM can be retracted as shown in FIG. 1B so as to pass the entire light from the lens LE1 to the photographic film FLM. In order to receive the light reflected from the photographic film FLM, there is provided a light receiving element SPCB for the purpose of flash light control. AFM represent a motor to drive the objective lens LE1 for an automatic focus control.

Figure 2:
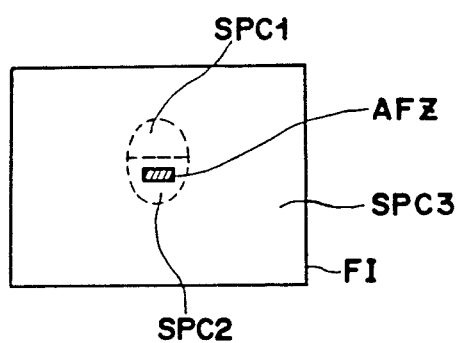
FIG. 2 is an enlarged front view of a light measurement unit used in the embodiment shown in FIG. 1A, FIGS. 3A and 3B are respectively schematic diagrams showing a front view of a finder used in the camera shown in FIG. 1 with the operation of the light measurement shown.

The arrangement of the light measuring device SPCA is shown in FIG. 2, wherein a pair of photo sensors SPC1 and SPC2 are juxtaposed in the central area of the device SPCA for measuring the intensity of light incident to the central portion thereof and another photo sensor SPC3 for measuring the intensity of light incident to the peripheral portion of the device SPCA. It is noted that FIG. 2 is depicted in a shape viewed from the finder in which a mark AFZ is displayed for clearly showing an automatic focus zone.

Figure 3A:
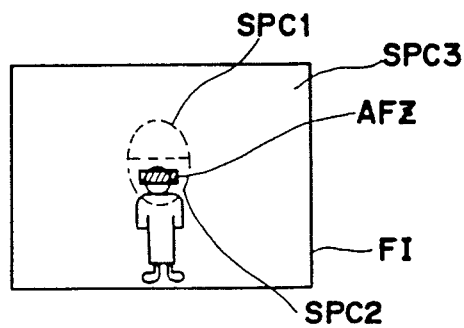
Figure 3B:
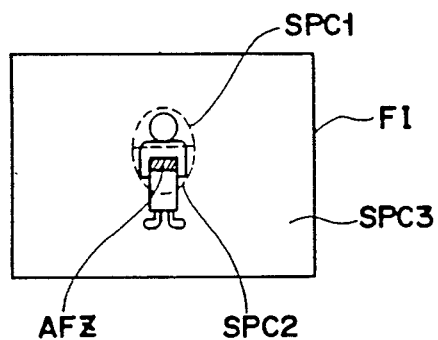

FIGS. 3A and 3B are for considering a divisional light measurement performed by the photo sensor SPC1 or SPC2 which includes the automatic focus zone AFZ, in which an automatic exposure is carried out in relation with the automatic focus adjustment. Assuming to take a picture of human's portrait including the face and the body wearing a cloth, if the face is situated in the automatic focus zone AFZ as in FIG. 3A, light measurement for the face can be made correctly by means of SPC2. However, if the body is situated in the automatic focus zone AFZ, as shown in FIG. 3B, a light measurement by SPC2 would cause over exposure or under exposure for the face depending on the reflection factor of the cloth. In order to eliminate the problem mentioned above, two photo sensors SPC1 and SPC2 are provided in accordance with the present invention and the exposure value is decided by the output of any one of the photo sensors SPC1 or SPC2 which actually receives smaller light. That is, as shown in FIG. 3A, in case the photo sensor SPC2 measures the light of the human's face and the photo sensor SPC1 measures back ground which is brighter than the face, the output of the photo sensor SPC2 which receives the smaller value of light is selected so that a correct exposure for the face is realized. On the other hand, as shown in FIG. 3B, assuming that the photo sensor SPC1 measures the human's face and the photo sensor SPC2 measures the human's cloth, in case the cloth is whitish and the reflection factor of the cloth is greater than the reflection factor of the face, the output of the photo sensor SPC1 which receives smaller amount of light is selected so that a correct exposure for the face is realized. In case of FIG. 3B, if the cloth is dark and the reflection factor of the cloth is less than the reflection factor of the face, the output of the photo sensor SPC2 would be selected and the exposure value is decided for the dark cloth, which would cause an over exposure amount is over exposure for the human's face. However since the photographic film has a wide latitude against the over exposure, it is possible to take a good picture without any problems in such a case.

Figure 8:
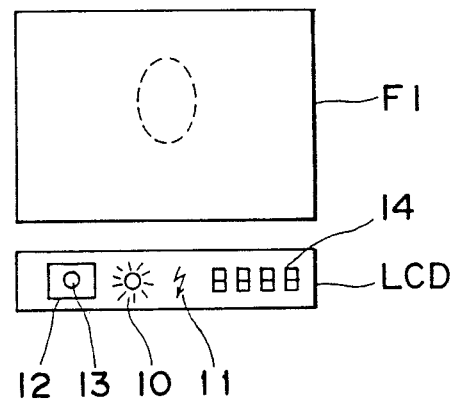
FIG. 8 is a schematic diagram showing an example of display used in the exposure control device according to the present invention, and FIG. 9 comprised of FIG. 9A to FIG. 9D to FIG. 15 are respectively flow charts showing the operation of the exposure control device according to the present invention.

As will be understood from FIG. 8, a display unit LCD is further visually provided in a suitable portion of finder view field according to the present invention. The display unit LCD comprises a mark 10 showing a day light synchro mode, a mark 11 showing a flash light mode, marks 12 and 13 showing average light measurement and spot light measurement and a digital display unit 14. The respective marks and digital display unit are made of for example LCD (liquid crystal display device).

Figure 4:
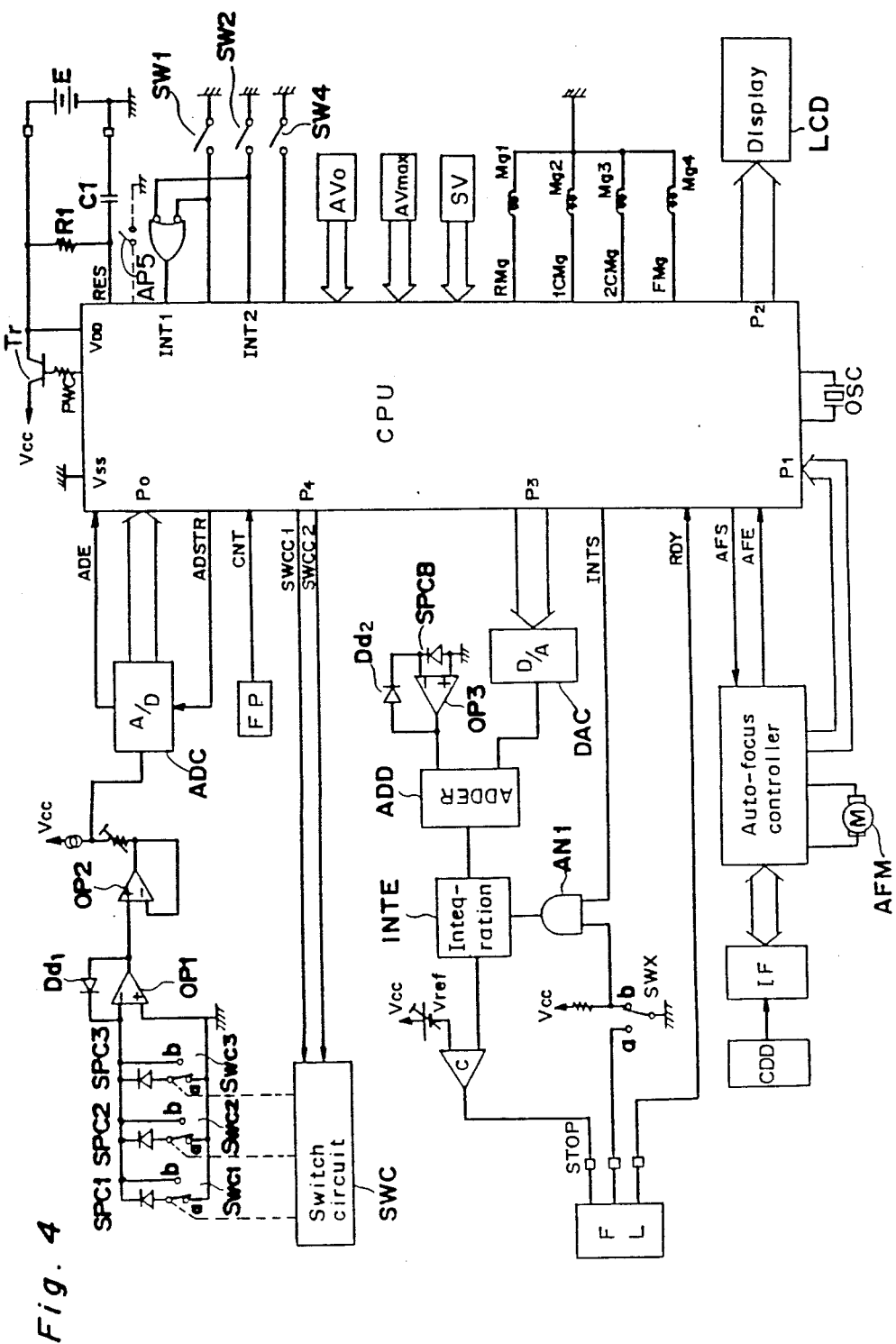
FIG. 4 is a circuit diagram showing an example of the exposure control device according to the present invention.

A circuit arrangement for the exposure control device according to the present invention is explained with reference to FIG. 4 in which a central processing unit (referred to as CPU hereinafter) made of a microprocessor is represented by CPU. E denotes a battery to which a capacitor C1 and a resistor R1 are connected to form a power on reset circuit for generation of a signal for resetting the CPU at the time of mounting the battery E. A transistor Tr acts to provide power source Vcc to peripheral circuits. Connected to CPU are first switch SW1 which is turned on in response to an initial step of press of a release button (not shown) of the camera up to the first depth, for executing the light measurement and automatic focus and second switch SW2 which is turned on, in response to an advanced step of press of the release button up to the second depth which is deeper than the first depth, for trigerring the the shutter release. The information of a fully opened aperture value AVo and the minimum aperture value AVmax are respectively fed from the lens circuit attached in the lens LE1. Sv represents a set film speed information. Mg1 denotes a release magnet for executing release of the shutter. Mg2 denotes a front curtain magnet, Mg3 a rear curtain magnet and Mg4 a control magnet. The outputs of the photo sensors SPC1 to SPC3 are respectively selected by switches Swc1 to Swc3 and the selected signal is logarithmically compressed in the logarithmic compressing circuit composed of an operation amplifier OP1 and compression diode Dd1, then fed to a further operation amplifier OP2 for level shifting and converted from the analog signal to the digital signal in a A/D converter ADC and in turn the digital signals are applied to CPU. A pulse generator FP applies pulse signals in the course of stopping-down operation of the aperture from its full open size, the number of pulses being counted by CPU for monitoring the advance of stopping-down operation. A switch controller SWC acts to change over the switches Swc1 to Swc3 in response to the instructions fed from CPU.

The output of the photo sensor SPCB measuring the light reflected from the photographic film FLM is applied to one input terminal of an adder ADD through a logarithmic compression circuit composed of an operation amplifier OP3 and a logarithmic compression diode Dd2. Another input terminal of the adder ADD is applied with a signal from CPU through a D/A converter DAC. The signal added in the adder ADD is integrated in an integral circuit INTE and the integrated signal is compared in a comparator C with a reference signal Vref. When the integrated signal exceeds the reference signal Vref, the comparator C gives a signal to a flash device FL so as to order to turn off the flash light. Integration in the integration circuit INTO can be initiated by an AND signal fed from an AND gate AN1 which receives a signal INTS from CPU and a signal at a contact (b) which is generated in response to change over of the X contact SWX for trigerring the flash device FL toward (a) side from (b) side.

The image of the photographic object situated in the automatic focus zone AFZ at the central portion of the finder can be sensed by the image sensor CCD and the sensed signal is fed to an automatic focus control circuit AFC through an interface IF. In the automatic focus control circuit AFC, the auto-focusing motor AFM is driven by the auto-focusing start signal AFS fed from CPU so as to shift the lens LE1 along the optical axis for focusing. When automatic focusing with respect to the photographic object taken in the automatic focus zone AFZ is once completed, the auto-focusing motor AFM is stopped and a signal AFE (referred to as focus completion signal hereinafter) representing completion of the automatic focusing is applied to CPU.

Figure 5:
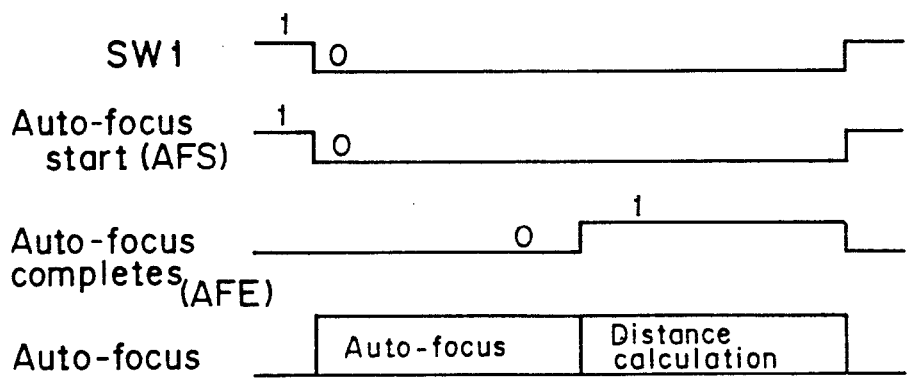
FIG. 5 is a time chart showing an operation of an automatic focusing control device shown in FIG. 4.

As in the above, the embodiment carries out the so-called "one shot automatic focus adjustment". FIG. 5 shows the time chart of the operation thereof. In the time chart, "0" level for the switch SW1 and auto-focusing start signal AFS represent that the switch SW1 is ON and the signal AFS is generated respectively. On the other hand, "1" level for auto-focusing completion signal (AFE) represents that the automatic focus adjustment has once been completed. In case the switch SW1 is kept ON after completion of the autofocusing, the lens LE1 is locked in the in-focus position and the auto-focus controller AFC computes only the distance measurement and the result of the distance measurement is applied to CPU through the line P1. In order to start the automatic focus control again, it is necessary to turn off the switch SW1 once then to turn on it again. When the switch SW1 is in OFF state, the auto-focusing start signal AFS is made 1 and the focus completion signal AFE is made 0 so that the operation returns to the initial state.

In CPU, INT1 and INT2 represent ports for receiving interruption.

Operation of the exposure control device is explained hereinafter by the aid of flow chart in FIGS. 9 to 15.

Figure 9A:
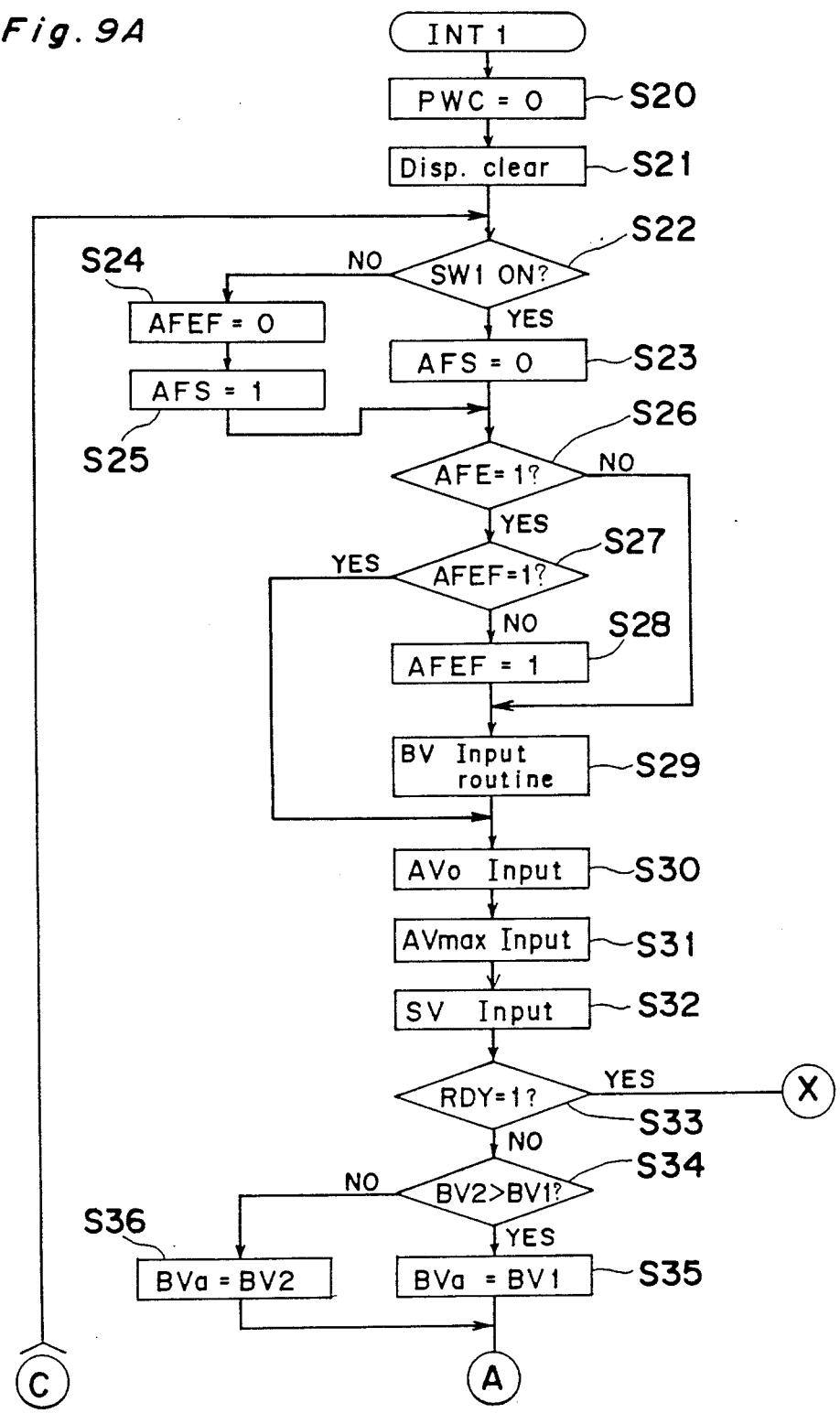
Figure 9B:
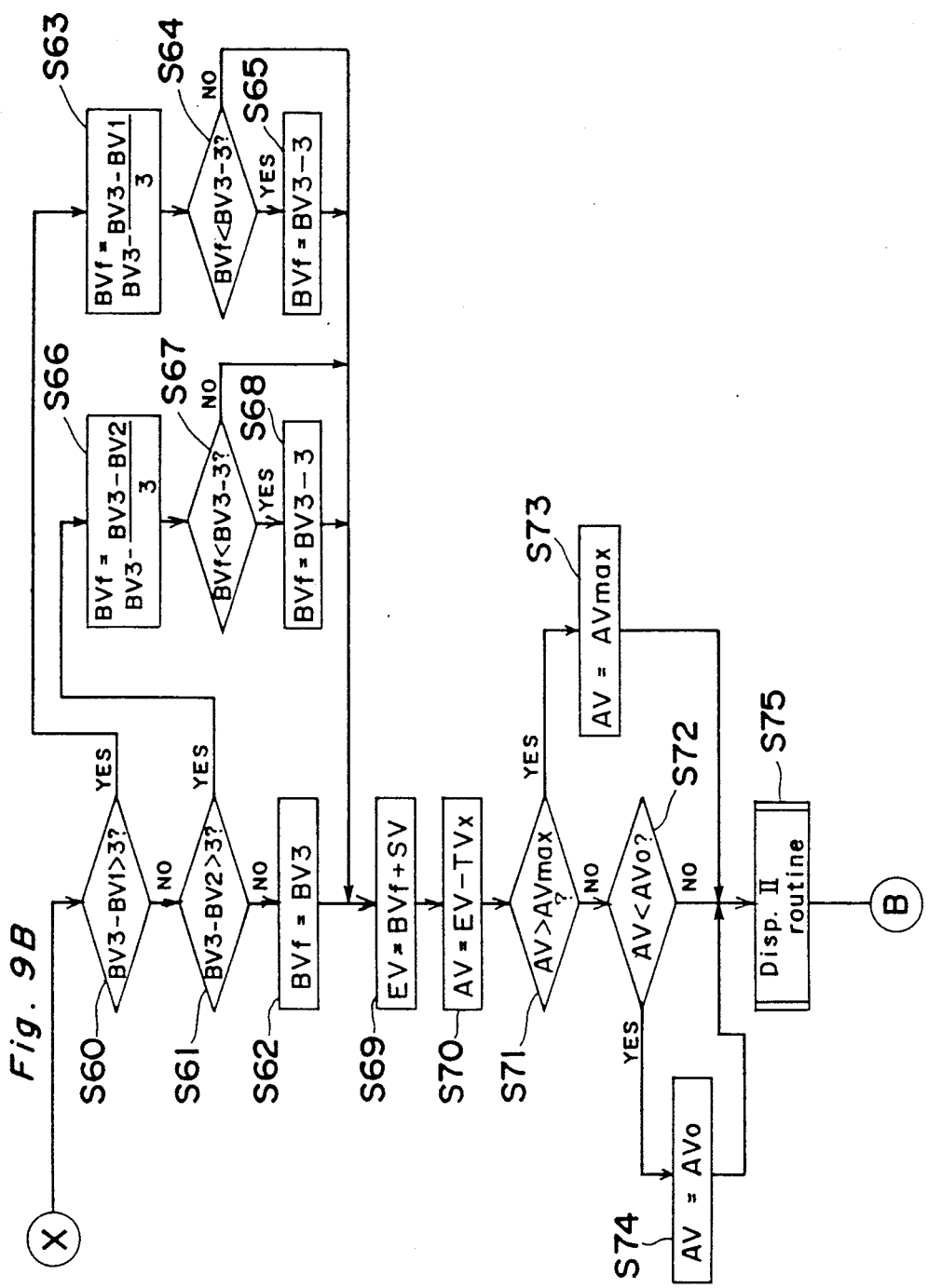
Figure 9C:
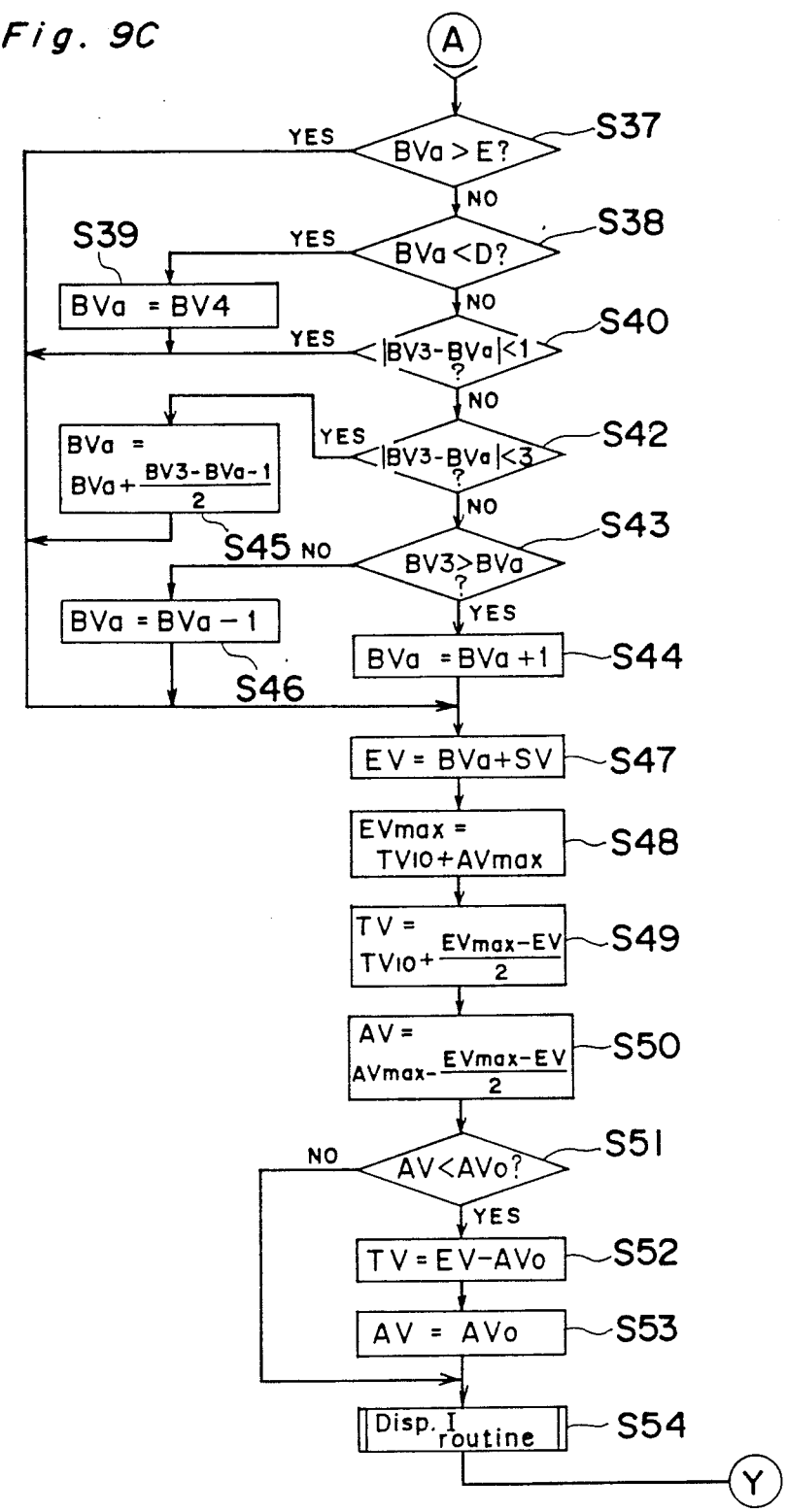
Figure 9D:
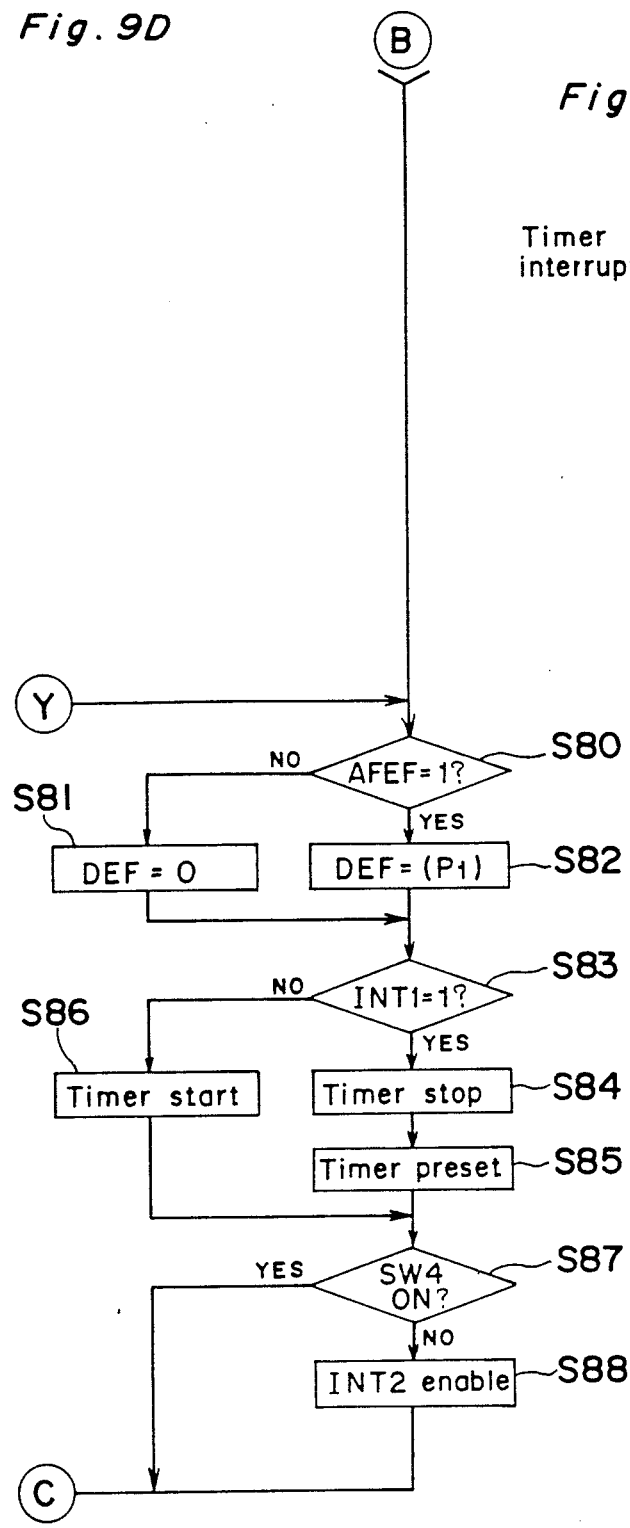
Figure 10:
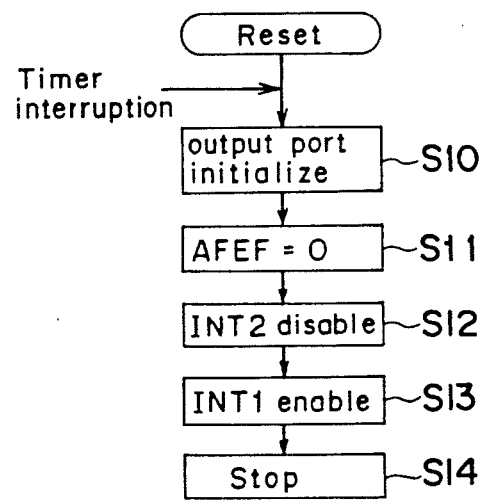

When the battery E is mounted in the camera in position, the power on reset is effected as shown in FIG. 10, wherein the respective output ports of CPU are initialized in the step S10 and the flag AFEF is set to "0" in the step S11. The "0" state of the flag AFEF means that the present state is not immediately after the automatic focus completion. In the step S12 an interruption to the port INT2 is disabled. In the step S13 the interruption to the port INT1 is enabled, then CPU is put in the stand-by condition in the step S14 and CPU stops until interruption is ordered. When the switch SW1 is turned on by pressing of the release button up to the first depth, the signal is applied to the port INT1 to effect the INT1 interruption and the processes shown in FIG. 9 is started.

In the step S20, the signal PWC is made 0 to turn on the transistor Tr to supply the power source to the peripheral circuits. Subsequently the content of the display unit LCD is cleared in the step S21. In the step S22, the condition of the switch SW1 is detected and if the switch is ON, the signal AFS is made 0 in the step S23 so as to enable the automatic focus controller AFC to carry out the automatic focusing operation. On the other hand, if the switch SW1 is OFF, AFEF=0 is set in CPU in the step S24 to represent that the present state is not immediately after the auto-focusing completion. Then the step goes to S25 to make the signal AFS=1, thereby stopping the automatic focusing operation. In this embodiment, CPU keeps its operating condition for a predetermined time even after the switch SW1 is turned off. Step S25 is for preventing the automatic focusing operation after the switch SW1 is made OFF.

In the step S26, it is judged whether or not the signal AFE=1 for detecting whether or not the autofocusing is completed. In case the signal AFE is 0 which means that the auto-focusing is not completed, the step goes to S29, on the other hand, with AFE=1, the step goes to S27 to judge whether or not the present state is immediately after the completion of the auto-focusing by the state of the flag AFEF. If AFEF is 1 at the step S27, the step goes to S30, on the other hand, with AFEF=0, the flag AFEF is set to 1 in the step S28, then goes to the step S29. The step S29 comprises a subroutine for taking the light measurement value Bv in CPU. By this operation, the light measurement value Bv is continuously taken in CPU untill completion of the auto-focusing, however, after completion of the auto-focusing, the last light measurement value immediately after the completion of the auto-focusing is stored in a memory but the light measuring value thereafter is not taken in CPU. However, if the depression of the release button is ceased and the switch SW1 is turned off, therefore the signal AFEF becomes 0, the light measurement value can be taken in CPU again. The subroutine of the step S29 is shown in FIG. 11 in detail.

Figure 11:
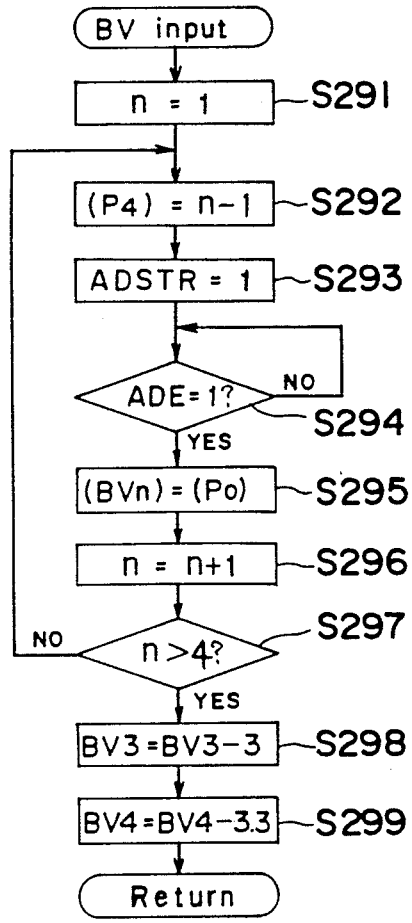

The value n is set to 1 in the step S291 of FIG. 11 and a value n−1 is represented by the combination of the signals SWCC1 and SWCC2 on the terminals P4 in the step S292. The switch controller SWC is controlled in response to the value n−1 for turning on any one of the switches SWC1 to SWC3 to select any one of the photo sensors SPC1 to SPC3 in accordance with the following Table 1:

TABLE 1

| n | SWCC1 | SWCC2 | SWC1 | SWC2 | SWC3 |
|---|---|---|---|---|---|
| 0 | 0 | 0 | a | b | b |
| 1 | 0 | 1 | b | a | b |
| 2 | 1 | 0 | b | b | a |
| 3 | 1 | 1 | a | a | a |

As will be understood from the Table 1, the location of spot measuring area can be shiftable between two cases where n−1=0 (SPC1) and n−1=1 (SPC2), and a light measurement by all the photo sensors (SPC1+SPC2+SPC3) is also possible where n−1=3.

A signal ADSTR for starting the A/D converter ADC is made 1 in the step S293 and the output of the selected photo sensor or photo sensors (any one of SPC1 to SPC3) is converted from the analog signal to the digital signal and is applied to the terminal $P_0$ of CPU. Then the step goes to S294 wherein it is judged whether or not the A/D conversion is completed by judging 1 of the signal ADE from the A/D converter ADC. With the completion of the A/D conversion, the step goes to S295, wherein the signal on the terminal $P_0$ is taken in CPU and stored in the register BVn. (in this case BV1). The value n is updated to increase by 1 in the step S296. Then the step goes to S297, wherein it is detected whether the value n<4. Namely the processes S292 to S296 are repeated until the value n becomes 4. Accordingly, the values of the output of the photo sensors SPC1, SPC2, SPC3 and SPC1+SPC2+SPC3 are respectively stored in the registers BV1 to BV4. The values stored in the registers BV3 and BV4 are corrected in the steps S298 and S299 by correcting the output difference of the respective light receiving area of the photo sensors SPC1 to SPC3 and SPC1+SPC2+SPC3. For example, assuming that the ratio of the light receiving areas of the photo sensors SPC1 and SPC3 is 1:8, the output of the photo sensor SPC3 is decreased by 3 Ev steps. Furthermore, assuming that the ratio of the light receiving areas of the photo sensors SPC1 and SPC1+SPC2+SPC3 is 1:10, the total output of SPC1+SPC2+SPC3 is decreased by 3.3 Ev steps.

Referring to FIG. 9, again, the aperture values $AV_0$, $AV_{max}$ and film speed SV are taken in CPU in the steps S30 to S32. Then in the step S33, the charge completion signal RDY from the flash device FL is judged. In case the charge to main capacitor in the flash device is completed and the signal RDY is 1, the step goes to after S60 for the flash operation mode, to the contrary, if the charge is not completed, and the signal RDY is 0, the step goes to after S34 for the ambient light operation.

In the steps S34 to S36, one of the outputs of the photo sensors SPC1 and SPC2 which receives less light is selected out as the value BVa, then it is judged in the steps S37 whether or not the selected value BVa is greater than the predetermined value E. If the value BVa is smaller than the value E, BVa is further compared with D in the step S38, and an average light measurement value BV4 is adopted as the light measurement value at the step S39 if BVa<D.

As mentioned above, in the present embodiment, (a) In case the light measurement value at the central portion of the light measuring device SPCA is smaller than the predetermined value, the average light measurement value is used.

(b) In case other than the case (a), the darker light measurement value of any one of the two photo sensors SPC1 and SPC2 each disposed adjacent each other in the central portion of the light measuring device SPCA is used.

Therefore, it is possible to eliminate the problem of bad linearity of the light measurement value due to such a reason why in case the brightness of the photographic object is low, the output current of the photo sensor is low. In addition, by the arrangement mentioned in the item (b), a correct exposure can be always performed regardless of the reflection coefficient of the photographic object such as human's cloth in case the light measuring device SPCA measures the cloth.

In case of D<BVa<E, the light measurement value BVa is compared with the light measurement value BV3 measured by the photo sensor SPC3 which senses the peripheral portion of the light measuring device SPCA in the steps S40 to S43. In case the brightness difference between BVa and BV3 is greater than a predetermined value, the value BVa can be corrected according to the difference so as to be an appropriate value in the steps S44 to S46. Specifically, in case of 1<BVa−BV3<3, the value BVa is corrected according to the equation BVa=BVa+½(BV3−BVa−1) in the step S45. In case of BVa−BV3>3, the value BVa is corrected according to the equation BVa=BVa−1 for BV3<BVa or BVa=BVa+1 for BV3 >BVa in the steps S46 or S44, respectively. By the correction mentioned above, it is possible to prevent making such a bad picture that the sub photographic object such as background or the like becomes white in case a correct exposure is conducted for only the main object under a large brightness difference between the main object and sub object due to rear light picture taking.

Figure 6:
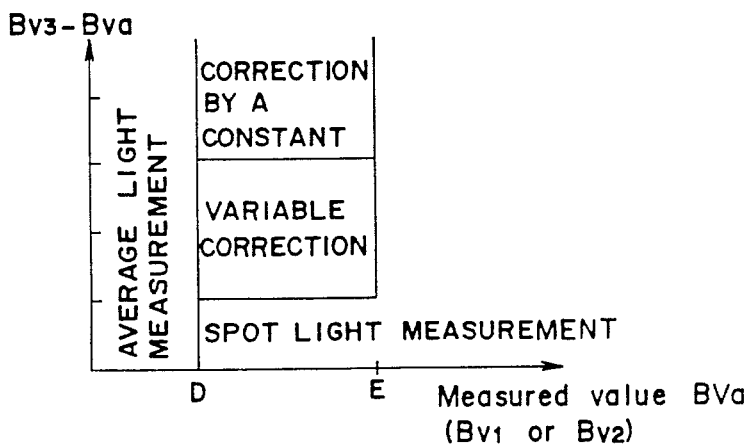
FIG. 6 is a schematic diagram showing various operation modes in the exposure control device according to the present invention.
Figure 7:
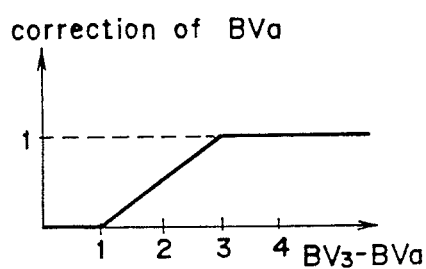
FIG. 7 is a graph showing a way of correction of the light measurement value according to the present invention.

FIG. 6 shows the change of the light measuring mode corresponding to the change of light measurement value BV (which is BV1 or BV2) and BVa−BV3. FIG. 7 shows the correction of the value BVa corresponding to the difference BVa−BV3.

The light measurement value BVa thus obtained as mentioned above is added by the film speed SV for obtaining an exposure value Ev in the step S47. The maximum exposure value $EV_{max}$ is calculated in the step S48 corresponding to the shortest shutter time $TV_{10}$ and minimum aperture size value $AV_{max}$. Subsequently, the necessary shutter time TV and aperture value AV are calculated in the steps S49 and S50 according to the following equations.

$$TV = TV_{10} - \tfrac{1}{2}(EV_{max} - EV)$$

$$AV = AV_{max} - \tfrac{1}{2}(EV_{max} - EV)$$

It is judged in the step S51 whether the calculated aperture value Av is smaller than the aperture diameter of the full opened aperture value $AV_0$. With $AV<AV_0$, the shutter time TV and the aperture value AV are changed in the steps S52 and S53 according to the equations $$TV = EV - AV_0$$

$$AV = AV_0.$$

On the other hand, if $AV>AV_0$, the calculated TV and AV are maintained.

Figure 12:
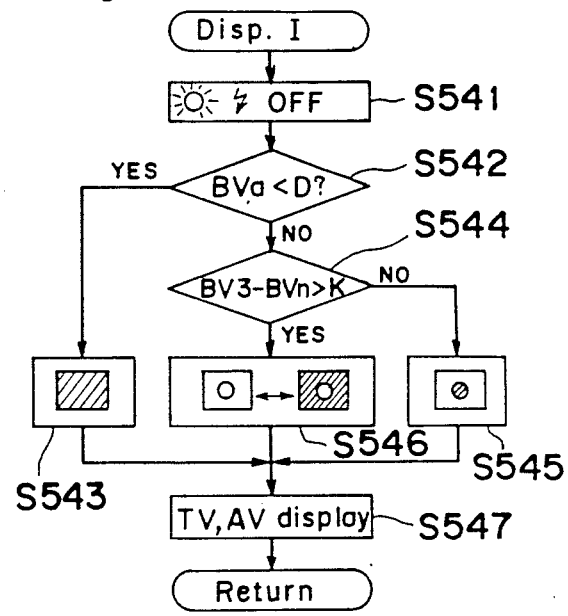

Referring to FIG. 12 showing the details of the sub routine for display I at the step S54 of FIG. 9C, the mark 10 in FIG. 8 showing the day light picture taking mode and the mark 11 also in FIG. 8 showing the flash picture taking mode are respectively deleted in the step S541. In the step S542, BVa<D is judged. In case BVa<D that is the light measurement value at the center of the light measuring device SPCA is smaller than a predetermined value D, the display showing the average light measurement exposure is displayed in the display device LCD of FIG. 8 using elements 12 and 13 in the step S543. In one example, the average light measurement exposure can be represented by making both elements 12 and 13 so that the square mark is made dark as a whole. In case the light measurement value BVa is greater than the predetermined value D, the brightness of the peripheral portion of the light measuring device SPCA and the light measurement value BVa are compared in the step S544 and if the brightness difference is smaller than a value K, a dark mark is displayed in the circular portion 13 of the display device LCD for displaying the spot light measurement exposure in the step S545. In case the brightness difference between the light measurement value BVa and the brightness of the peripheral portion of the light measuring device SPCA is greater than the predetermined value K, a mark showing the rear light light measurement exposure is displayed in the step S546. In the example, the rear light measurement exposure is displayed by turning on and off alternatingly the element 12 with element 13 unchanged. By the arrangement mentioned above, an operator can know what exposure mode is used directly and there is no need to provide a separated light measuring device for detecting the rear light condition. Subsequently the shutter time TV and aperture value Av are displayed in the four digit display area 14 in the step S547. When the above routine corresponding to the step S54 in FIG. 9C is completed, the step goes to S80 of FIG. 9D.

In case it is detected in the step S33 of FIG. 9A that the charging of the main capacitor of the flash device is completed, the program for the flash picture taking after the steps S60 of FIG. 9B is performed. It is detected in the step S60 whether the difference between the value BV3 showing the brightness in the peripheral portion and the value BV1 of the central portion is not greater than 3. Also whether or not the difference between the value BV3 and the central portion BV2 is not greater than 3 is detected in the step S61. If both of the differences are not greater than 3, the light measurement value BV3 is used as the light measurement value BVf in the step S62.

In case the difference is greater than 3 in the step S60 (or S61), that is in case of the rear light picture taking mode, the value BVf calculated by the following equation $$BVf = BV3 - \tfrac{1}{3}(BV3 - BV1 \text{ (or BV2)}),$$

is used as the light measurement value BVf for the flash light picture taking in the step S63 (or S66). In other words, the value BVf can be obtained by modifying BV3 in accordance with the difference between the value BV3 of the peripheral portion and the values BV1 or BV2 of the central portions of the light measuring device SPCA. It is judged in the step S64 (or S67) whether or not the value BVf obtained in the step S63 (or S66) is less than BV3−3. When BVf is less than BV3−3, the value BVf is determined by BV3−3 in the step S65 (or S68) in place of the determination of BVf in the step S63 (or S66). When BVf is greater than BV3−3, on the other hand, the value BVf obtained in the step S63 (or S66) is maintained as it is. Thus the modification of the value BVf through steps S63 to S68 is limited to a shift by value 3 in any case. Namely, (a) in case the peripheral portion of the light measuring device SPCA is remarkably brighter than the central portion thereof, an over exposure (less than 3 Ev) is set for the peripheral portion. The central portion which may be under exposure is compensated by the flash light.

(b) in case there is few difference in brightness between the central portion and peripheral portion of the light measuring device SPCA, an appropriate exposure value is employed for the peripheral portion. The exposure for the central portion is controlled by the flash light.

By the arrangement mentioned above, in case of rear light picture taking, the peripheral portion may be over exposed so that a picture with a natural rear light effect can be realized as viewed by eyes.

Figure 13:
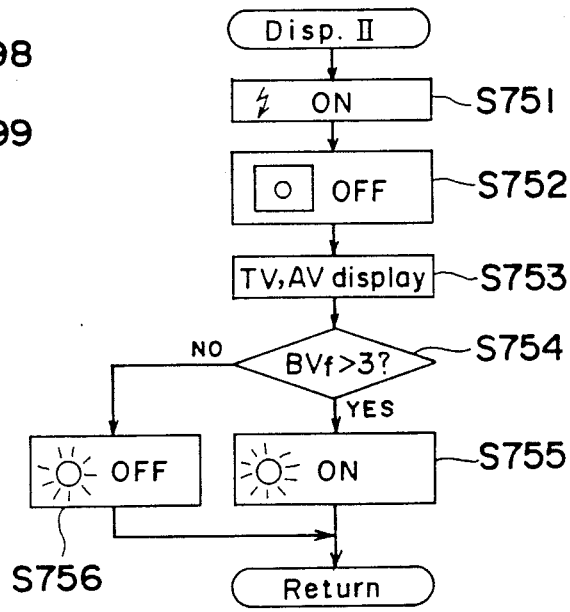

Subsequently, the light measurement value BVf is added with the film speed SV for obtaining the exposure value EV in the step S69, then in turn the aperture value AV appropriate for the synchronized shutter speed TVx in the step S70. It is judged in the steps S71 and S72 whether the calculated aperture value AV is greater than the minimum aperture size value AVmax or less than the full open aperture value $AV_0$. In case the aperture value AV is out of the range from $AV_0$ to AVmax, the minimum aperture size value AVmax or full open aperture value $AV_0$ is used in the step S73 or S74 and the step goes to S75 of the display II routine as shown in FIG. 13.

The display II relates to the charge completion of the flash device and the day light flash photography. In the step S751, the mark 11 shown in FIG. 8 is turned on. In the step S752, the marks 12 and 13 are turned off. In the step S753, the shutter speed TV and aperture value AV are displayed at the display unit 14. The value BVf when the flash light is used is compared with 3 in the step S754. In case BVf is greater than 3, the mark 10 for the day light synchro (i.e., day light flash photography) is turned on in the step S755. In case BVf is smaller than 3, on the other hand, the step goes to S756 to turn off the mark 10. When the display II routine is completed, the step goes to S80 in FIG. 9D to judge whether or not the flag AFEF is 1 in which the state is immediately after the auto-focusing is completed.

In case the flag AFEF is 0 that is the autofocusing is not completed, the step goes to S81 to make the defocus value (DEF) 0. The term of defocus value shows the displacement of the image formed by the lens from the focal plane. In case the flag AFEF is 1, although the lens LE1 is not driven, the auto-focus controller AFC is enabled so that the defocus value DEF is applied consecutively to CPU from the auto-focus controller AFC through the terminal P1. The defocus value DEF obtained in the step S82 is utilized for adjusting the flash light value as mentioned hereinafter. In the step S83, the signal INT1 is judged to detect whether or not the switch SW1 of the release button is made ON. In case the switch SW1 is on, the timer in CPU is stopped in the step S84 and preset in the step S85. In case the switch SW1 is off, the step goes to S86 to start the timer in CPU so as to supply the power for the predetermined time even if the switch SW1 is turned off with the release the button unpressed. In case the switch SW1 is not turned on again during the predetermined time set by the timer, the step returns to S10 by the timer interruption to bring CPU at the stand-by condition. In the step S87, it is judged whether or not the switch SW4 which is tuned off by the completion of the film winding by one frame. In case the switch SW4 is OFF, the interruption to the port INT2 is enabled in the step S88 to go to the step S22 in FIG. 9A. In case the switch SW2 is turned on by the press of the release button up to the second depth, the INT2 interruption is triggered and the INT2 routine shown in FIG. 14 is performed.

Figure 14:
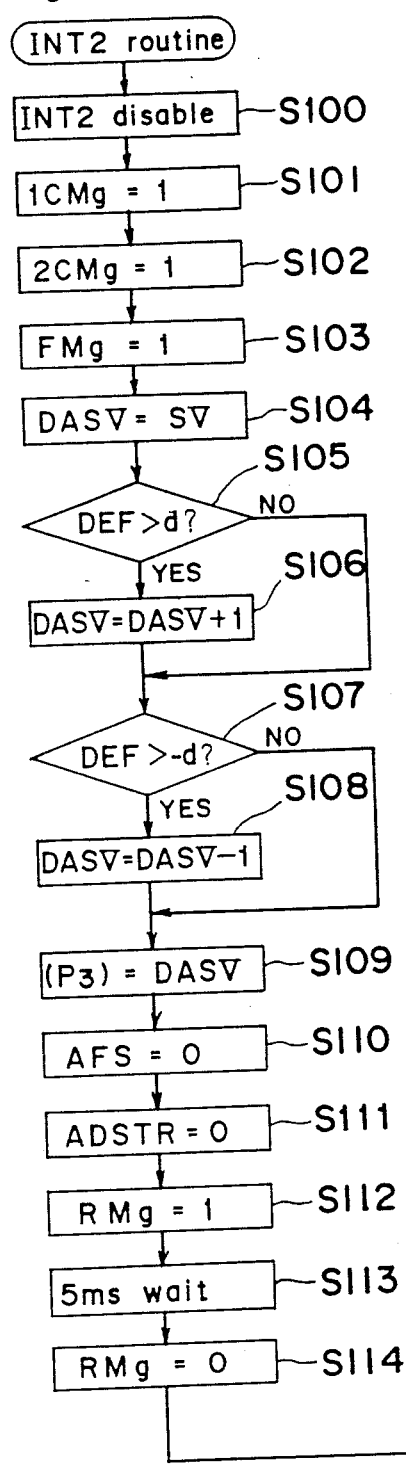

Referring to FIG. 14, the INT2 interruption is disabled in the step S100 and the magnets Mg2, Mg3 for the first and second curtains and the aperture control magnet Mg4 are turned on in the steps S101, S102 and S103. These operations are caused by the signals 1CMg, 2CMg and FMg turn to "1", respectively.

In the step S104, the flash light value DASV is set by the film speed SV, then the value DASV is corrected corresponding to the defocus value DEF in the steps S105 to S108. Specifically, it is judged whether or not the value DEF is greater than a predetermined value d in the step S105. In case DEF is greater than d that is in case the photographic object in the center of the finder at the time of the shutter releasing is located further from the camera than the distance at the time of the focus locking, 1 is added to the value DASV. To the contrary, in case the value DEF is smaller than $-d$, that is the photographic object in the center of the finder is located closer to the camera, the value DASV is subtracted by 1.

Thus, the flash light value is controlled according to the defocus value in a manner summarized below.

(a) In case of $-d < DEF < d$, normal flash light value which provides a correct exposure for an object at the center of the object field is used.

(b) In case of $DEF > d$, the flash light is slightly reduced than the case (a).

(c) In case of $DEF < -d$, the flash light is slightly increased than the case (a).

In the flash device of a TTL (through the lens) light adjustment type, when there is not the photographic object in the central portion of the finder but is located in the peripheral portion thereof with a background located in the central portion, an over exposure tends to occur corresponding to the light measurement map since the reflection from the central portion of the finder is few. To the contrary, in case the sub object located in the central portion is located nearer to the camera than the main object located in the peripheral portion, an under exposure tends to occur. These phenomena may occur when the flash device is controlled by receiving reflection light which does not pass through the objective leans is used due to the light measurement map and the uneven light distribution.

However, by correcting the amount of the flash light as mentioned above, even if the main object which was in the central portion of the view finder upon automatic focus adjustment is arranged out of the central portion of the picture at the time of shutter releasing, the main object can be exposed with the appropriate exposure value irrespective of the distance of the sub object situated in the central portion of the picture. The correction mentioned above may be changed depending on the value d.

Figure 15:
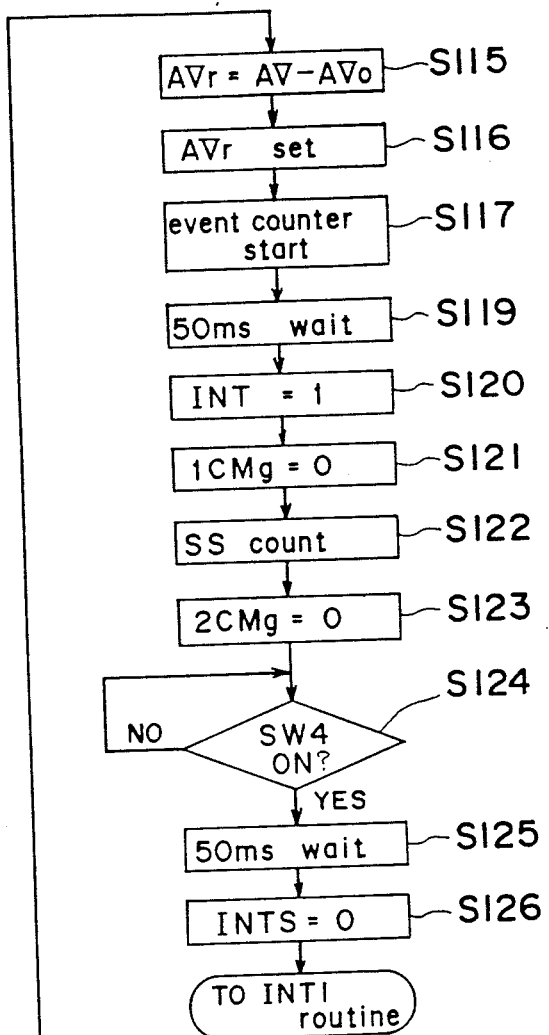
Figure 15:
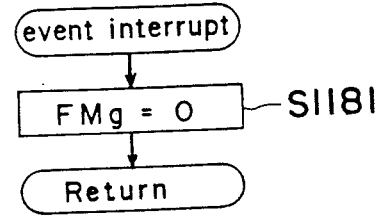

Referring to FIG. 14 again, the light value DASV is supplied from CPU to the D/A converter DAC through the port p3 in the step S109 and is converted into the analog form. Then the signal AFS is made 1 to stop the function of autofocus controller AFC in the step S110. Subsequently the signal ADSTR is made 0 in the step S111 to stop the A/D converter ADC. The the signal RMg is made 1 in the step S112 and the release magnet Mg1 is excited to release the shutter. After waiting for 5 msec. in the step S113, the signal RMg is made 0 to deenergize the release magnet Mg1 in the step S114. The number of step AVr for controlling the aperture value from AV0 to AV is calculated in the step S115, and the number of step AVr is stored in the event counter in CPU in the step S116, then the event counter starts in the step S117. By the way, when the release magnet Mg1 is excited to release the aperture closing element which is initially situated at the fully opened position, the aperture closing element is moved toward the closing position. During the stopping-down motion of the diaphragm aperture, the pulses fed from the pulse output circuit FP corresponding to the movement of the aperture closing element are counted by the event counter. When the number of pulses corresponding to the step AVr of the aperture closing value preset in the event counter are counted, an interruption is applied by the event counter. In FIG. 15 in which the routine caused by the event counter interruption is shown, the signal FMg is made 0 in the step S1181 to turn off the magnet Mg4, whereby the movement of the aperture closing element is stopped and the diaphragm aperture is set in position corresponding to the aperture value AV. In FIG. 14, subsequent to the step S117, the program waits for 50 msec. in the step S119. Thereafter, the signal INTS is made 1 in the step S120 so as to enable the AND gate AN for preparing the start of integration circuit INTE which is to be caused by the switch SWX changed over to the position (a). The signal 1CMg is made 0 in the step S121 to deenergize the magnet Mg2 for moving the first curtain. In the step S122 the shutter open time SS is counted and when a predetermined time is reached, the signal 2CMg is made 0 in the step S123 to turn off the magnet Mg3 so that the second curtain is moved to close the shutter and the exposure is finished. When the switch SW4 which has been set in the off state by the completion of the film winding is detected in the step S124 to be turned on by the completion of the movement of the second curtain, the step goes to S125 for waiting 50 msec.. After waiting 50 msec., the signal INTS is made 0 and the operation returns to the INT1 routine in FIG. 9A.

Although there are provided two photo sensors SPC1 and SPE2 in the central portion of the light measuring device SPCA, only one photo sensor may be used in the central portion if limited operations which do not necessarily need two photo sensors are only desired.

It is noted that the present invention may be applied to a camera system using a camera and a flash device which controls the flash light amount by itself by measuring light which does not pass through the objective lens of the camera. In this case the signal representing the defocus value occurring at the time of shutter release after an automatic focus is once established and the focus is locked is applied to the flash device from the camera, whereby the light adjusting level in the flash device is modified in accordance with said signal. Also the present invention may be applied to a continuous automatic focusing camera other than the one shot automatic focusing camera for a case in which a delay in automatic focus adjustment exists against the change in the object at the center of the view finder.

It is further noted that there may be provided such a modification which merely indicates the rear light condition in place of correcting the measured light value at the central portion of the light measuring block at the time of rear light condition under the ambient light. It may be possible to manually change over between the average light measurement mode and the spot light measurement mode by a change over switch APS (as shown in dotted line in FIG. 4) in place of the automatic change over means employed in the embodiment mentioned above.

It is further noted that although in the embodiment mentioned above, the light value correction is adapted when the absolute value of $BVa - BV_3$ is greater than 1 in the steps S44 to S46, it may be possible to correct the light measurement value only when $BV_3 - BVa$ is greater than 1, while the exposure control is performed based on the light measurement value BVa without correction of the light measurement value when $BVa - BV_3$ is greater than 1.

One advantage of the present invention is to enable to take a picture with a natural rear light effect in day light flash photography by using a slightly over exposure against the background and using an appropriate exposure by controlling of the flash light to the main object.

Another advantage of the present invention is to enable to control an appropriate exposure by flash light for the main object at the peripheral portion of the object field since the flash light amount of the flash light is modified corresponding to the distance information of the sub object situated at the central portion of the picture after the focus is locked at the main object.

A further advantage of the present invention is in that it is capable to change the location of spot light measurement within the object field, e.g., between human's face and his cloth, without moving the camera.

A still further advantage of the present invention is in that the operator can know what picture taking mode among the average light measurement mode, partial light measurement mode and rear light measurement mode is going to be formed by the indication on the display device, so that a correct operation can be taken by seeing the display.

A still further advantage of the present invention is to enable to take a picture with a good exposure depicting a natural light contrast preventing undue brighter portion due to an over exposure even if the picture is taken under the rear light condition since when it is judged that the exposure value by the spot light measurement is not suitable, a modified measurement data is used for deciding the exposure value.

What is claimed is:

1. An exposure control device for a camera comprising:
   first means for measuring light from a central area of an object field, said first measuring means including a plurality of means for receiving light from different portions within the central area, respectively;
   second means for measuring light from a surrounding area other than the central area, the surrounding area being greater than each portion within the central area;
   means for selecting between a first exposure control mode and a second exposure control mode; and
   means for controlling exposure in accordance with on of said plurality of receiving means in said first exposure control mode, and in accordance with all of said plurality of receiving means and said second measuring means in said second exposure control mode.

2. The exposure control device according to claim 1, wherein said controlling means includes means for choosing the one of said plurality of receiving means in said first exposure control mode.

3. The exposure control device according to claim 2, wherein said choosing means is adapted to automatically chose a receiving means which receives the least light.

4. The exposure control device according to claim 1, further comprising means for detecting a focus to at least one of said portions within the central area, means for adjusting focus in response to said detecting means to generate an in-focus signal when an in-focus condition is established, means for modifying a light measuring output from said first measuring means with a light measuring output from said second measuring means to generate a third light measuring output, and means responsive to said first and second measuring means for examining whether or not an exposure control in accordance with only said first measuring means is appropriate, wherein said controlling means includes means for adopting, upon the generation of the in-focus signal, the light measuring output from said first measuring means when said examining means finds it appropriate, and adopting, upon the generation of the infocus signal, the third light measuring output when said examining means decides inappropriate.

5. The exposure control device according to claim 1, further comprising means for modifying a light measuring output from said first measuring means with a light measuring output from said second measuring means to generate a third light measuring output, and means responsive to said first and second measuring means for examining whether or not an exposure control in accordance with only said first measuring means is appropriate, wherein said controlling means includes means for adopting the light measuring output from said first measuring means when said examining means finds it appropriate, and adopting the third light measuring output when said examining means decides inappropriate.

6. An exposure control device comprising
   first means for measuring light from a first area of an object field;
   second means for measuring light from a second area of an object field other than the first area;
   means for detecting focus to at least a position within said first area;
   means for adjusting focus in response to said detecting means to generate an in-focus signal when an in-focus condition is established;
   means for modifying a light measuring output from said first measuring means with a light measuring output from said second measuring means to generate a third light measuring signal;
   means responsive to said first and second measuring means for examining whether or not an exposure control in accordance with only said first measuring means is appropriate; and
   means for controlling exposure in accordance with the light measuring output from said first measuring means obtained upon the generation of the in-focus signal when said examining means decides appropriate, and in accordance with the third light measuring signal obtained upon the generation of the in-focus signal when said examining means decides inappropriate.

* * * * *